(12) United States Patent
Martin et al.

(10) Patent No.: US 10,970,287 B2
(45) Date of Patent: Apr. 6, 2021

(54) PERFORMING CROSS-TABULATION USING A COLUMNAR DATABASE MANAGEMENT SYSTEM

(71) Applicant: Open Text Holdings, Inc., San Mateo, CA (US)

(72) Inventors: Carles Bayès Martin, Barcelona (ES); Jesús Malo Poyatos, Barcelona (ES); Marc Rodriguez Sierra, Barcelona (ES); Alejandro Sualdea Pérez, Barcelona (ES)

(73) Assignee: OPEN TEXT HOLDINGS, INC., Halifax (CA)

( * ) Notice: Subject to any disclaimer, the term of this patent is extended or adjusted under 35 U.S.C. 154(b) by 185 days.

(21) Appl. No.: 16/370,122

(22) Filed: Mar. 29, 2019

(65) Prior Publication Data

US 2019/0228011 A1     Jul. 25, 2019

Related U.S. Application Data

(63) Continuation of application No. 15/430,223, filed on Feb. 10, 2017, now Pat. No. 10,282,355, which is a
(Continued)

(51) Int. Cl.
   *G06F 16/2455*     (2019.01)
   *G06F 16/22*     (2019.01)
(Continued)

(52) U.S. Cl.
CPC ........ *G06F 16/2456* (2019.01); *G06F 16/221* (2019.01); *G06F 16/2465* (2019.01); *G06F 16/24542* (2019.01); *G06F 16/283* (2019.01)

(58) Field of Classification Search
CPC ............... G06F 16/278; G06F 16/2455; G06F 16/2465; G06F 16/221; G06F 16/24578;
(Continued)

(56) References Cited

U.S. PATENT DOCUMENTS 6,041,053 A     3/2000    Douceur
6,941,318 B1     9/2005    Tamayo et al.
(Continued)

OTHER PUBLICATIONS

Office Action for U.S. Appl. No. 15/595,448, dated May 10, 2019, 31 pgs.
(Continued)

*Primary Examiner* — Dangelino N Gortayo
(74) *Attorney, Agent, or Firm* — Sprinkle IP Law Group

(57) ABSTRACT

Cross-tabulation operation is performed within a columnar database management system. The columnar database management system receives a request to perform a cross-tabulation operation on a set of database tables. The columnar database management system determines values of cross-tabulation operation for each row of the result. The columnar database management system determines a domain for each value of the row dimension corresponding to a row combination. The columnar database management system determines an intersection set of the domains corresponding to values of the row dimensions for the row combination. The columnar database management system determines a value for the result column for the row combination as an aggregate value based on the records of the intersection set.

20 Claims, 4 Drawing Sheets

Related U.S. Application Data continuation of application No. 14/307,711, filed on Jun. 18, 2014, now Pat. No. 9,600,539.

(60) Provisional application No. 61/837,780, filed on Jun. 21, 2013.

(51) Int. Cl.
   *G06F 16/2458* (2019.01)
   *G06F 16/2453* (2019.01)
   *G06F 16/28* (2019.01)

(58) Field of Classification Search
   CPC . G06F 16/28; G06F 16/2255; G06F 16/24542
   USPC .................. 707/722, 754, 769, 776
   See application file for complete search history.

(56) References Cited

U.S. PATENT DOCUMENTS

| | | | |
|---|---|---|---|
| 7,031,978 | B1 | 4/2006 | Hornick et al. |
| 7,346,601 | B2 | 3/2008 | Chaudhuri |
| 7,421,660 | B2 | 9/2008 | Charnock et al. |
| 7,945,850 | B2 | 5/2011 | Machalek |
| 9,081,849 | B2 | 7/2015 | Cushing |
| 9,094,258 | B2 | 7/2015 | Broda |
| 9,183,529 | B2 | 11/2015 | Gluzman |
| 9,218,373 | B2 | 12/2015 | Saito |
| 9,405,821 | B1 | 8/2016 | Bessis |
| 9,600,539 | B2 | 3/2017 | Martin et al. |
| 9,607,019 | B1* | 3/2017 | Swift .................. G06F 16/2255 |
| 9,679,000 | B2 | 6/2017 | Martin et al. |
| 9,798,783 | B2 | 10/2017 | Martin et al. |
| 10,282,355 | B2 | 5/2019 | Martin et al. |
| 10,606,852 | B2 | 3/2020 | Martin et al. |
| 10,642,806 | B2 | 5/2020 | Martin et al. |
| 2002/0013786 | A1 | 1/2002 | Machalek |
| 2003/0158842 | A1 | 8/2003 | Levy |
| 2004/0153456 | A1 | 8/2004 | Charnock et al. |
| 2007/0088731 | A1 | 4/2007 | Chant |
| 2007/0174252 | A1 | 7/2007 | Rawlings et al. |
| 2009/0019029 | A1 | 1/2009 | Tommaney |
| 2010/0010986 | A1 | 1/2010 | Icho |
| 2010/0088309 | A1 | 4/2010 | Petculescu et al. |
| 2012/0084278 | A1 | 4/2012 | Franke |
| 2012/0310874 | A1 | 12/2012 | Dantressangle |
| 2013/0073513 | A1 | 3/2013 | Kemper |
| 2013/0232176 | A1 | 9/2013 | Plattner |
| 2013/0342542 | A1 | 12/2013 | Brant et al. |
| 2014/0012881 | A1 | 1/2014 | Roesch |
| 2014/0040306 | A1 | 2/2014 | Peregrine |
| 2014/0188820 | A1* | 7/2014 | Pederson .......... G06F 16/24553 707/693 |
| 2014/0188924 | A1* | 7/2014 | Ma .................... G06F 16/24542 707/765 |
| 2017/0154079 | A1 | 6/2017 | Martin et al. |
| 2017/0249343 | A1 | 8/2017 | Martín et al. |
| 2018/0011909 | A1 | 1/2018 | Martin et al. |
| 2020/0226134 | A1 | 7/2020 | Martin |
| 2020/0250162 | A1 | 8/2020 | Martin |

OTHER PUBLICATIONS

Notice of Allowance for U.S. Appl. No. 15/714,358, dated Nov. 19, 2019, 6 pgs.
Notice of Allowance for U.S. Appl. No. 15/595,448, dated Jan. 16, 2020, 2 pgs.
Office Action for U.S. Appl. No. 14/307,711, dated May 13, 2016, 16 pgs.
Office Action for U.S. Appl. No. 14/308,971, dated May 18, 2016, 22 pgs.
Office Action for U.S. Appl. No. 14/303,581, dated Jul. 14, 2016, 23 pgs.
Office Action for U.S. Appl. No. 14/303,581, dated Oct. 25, 2016, 31 pgs.
Office Action for U.S. Appl. No. 14/303,581, dated Feb. 16, 2017, 23 pages.
Office Action for U.S. Appl. No. 15/430,223, dated Oct. 1, 2018, 14 pgs.
Office Action for U.S. Appl. No. 15/595,448, dated Jan. 2, 2019, 26 pgs.
Notice of Allowance for U.S. Appl. No. 15/430,223, dated Feb. 4, 2019, 7 pgs.

* cited by examiner

PERFORMING CROSS-TABULATION USING A COLUMNAR DATABASE MANAGEMENT SYSTEM

CROSS REFERENCE TO RELATED APPLICATION(S)

This application is a continuation of, and claims a benefit of priority from U.S. patent application Ser. No. 15/430,223, filed Feb. 10, 2017, entitled "PERFORMING CROSS-TABULATION USING A COLUMNAR DATABASE MANAGEMENT SYSTEM," which is a continuation of, and claims a benefit of priority from U.S. patent application Ser. No. 14/307,711, filed Jun. 18, 2014, issued as U.S. Pat. No. 9,600,539, entitled "PERFORMING CROSS-TABULATION USING A COLUMNAR DATABASE MANAGEMENT SYSTEM," which in turn claims a benefit of priority from U.S. Provisional Application No. 61/837,780, filed Jun. 21, 2013. All applications referenced in this paragraph are fully incorporated by reference herein.

FIELD OF DISCLOSURE

This invention relates generally to data mining operations, and in particular to performing cross-tabulation using a columnar database management system.

DESCRIPTION OF THE RELATED ART

Data mining operations are often employed by enterprises to process data sourced from various database management systems. Data is often represented as sets of various types of entities, for example, products, employees, users of a system, transactions performed by an online system and so on. Data mining systems perform operations on these sets of data, for example, union, intersection, difference, and so on. One operation performed by data mining systems is cross-tabulation of tables. Conventional techniques for performing cross-tabulation often perform inefficiently because they load the same data multiple times for performing various steps. As a consequence, performing cross-tabulation is often inefficient and consumes more computing resources than needed.

SUMMARY

Embodiments of the invention perform cross-tabulation on tables. A columnar database management system receives a request to perform a cross-tabulation operation on a set of database tables. The request specifies row dimensions based on columns of database tables participating in the cross-tabulation operation. The columnar database management system determines the result of cross-tabulation operation by performing following steps for each row of the result. Each row of the result is associated with a combination of values corresponding to the row dimensions. The columnar database management system determines a domain for each value of the row dimension corresponding to the combination. The domain comprises a set of records of the table that match the value of the row dimension. The columnar database management system determines an intersection set of the domains corresponding to values of the row dimensions for the row combination. The columnar database management system determines a value for the result column for the row combination as an aggregate value based on the records of the intersection set.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

Figure 1:
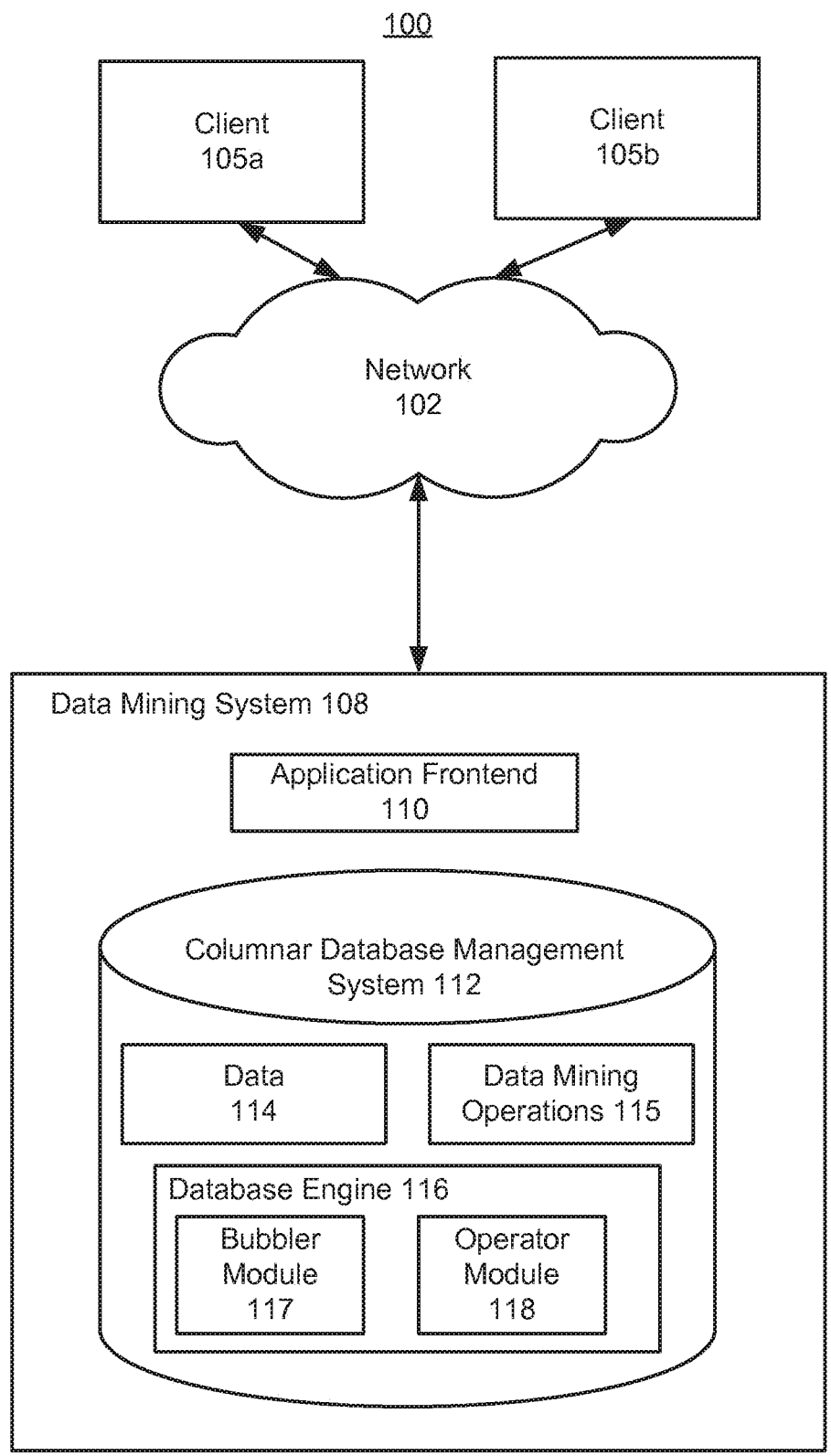
FIG. 1 is a high-level diagram illustrating an environment for performing a cross-tabulation calculation using a columnar database management system, according to one embodiment.

FIG. 1 illustrates an example of an environment 100 for performing a cross-tabulation calculation. As shown in FIG. 1, a client 105 is in communication with a data mining system 108 over a network 102. The client 105 is a computing device usable by a user to initiate data mining requests. A letter after a reference numeral, such as "105a," indicates that the text refers specifically to the element having that particular reference numeral, while a reference numeral in the text without a following letter, such as "105," refers to any or all of the elements in the figures bearing that reference numeral.

The data mining requests may indicate to the data mining system 108 to perform one or more data mining algorithms on data stored by the data mining system 108. For example, the data mining request may indicate that a cross-tabulation calculation operation be performed. In one aspect, the client 105 may be a suitable computing device, such as a desktop computer, a laptop computer, a workstation, a server computer, a mobile phone, a tablet device, etc.

As shown in FIG. 1, the data mining system 108 includes, among other components, an application frontend 110 and a columnar database management system 112. The application frontend 110 may be a software application configured to receive data mining requests from the client 105 and/or provide data mining results to the client device 105. In one embodiment, the application frontend 110 may forward or route data mining requests to the columnar database management system 112 for data processing. The application frontend 110 may additionally receive data mining results from the columnar database management system 112 for transmission to a client 105. In one embodiment, the application frontend 110 does not include and/or is not configured to use data mining algorithms to process data indicated by a data mining request.

The columnar database management system 112 is a system configured to store data according to a column oriented scheme. As shown in FIG. 1, the columnar database management system 112 includes data 114, data mining algorithms 115, and a database engine 116. In one aspect, data 114 includes various columns of data, where each column is associated with a logical set.

The database engine 116 is a logical entity configured to create, read, update and delete data stored by the columnar data management system 112. In one embodiment, the database engine 116 is also configured to perform data mining using the data mining operations 115 and the data 114. In one embodiment, the data mining algorithms 115 include a cross-tabulation operation for performing cross-tabulation calculations.

In the embodiment, responsive to receiving a data mining request to perform a cross-tabulation calculation directly from the client 105 or forwarded by the application frontend 110, the database engine 116 performs various steps to process the request and perform the cross-tabulation calculation. In some embodiments, the database engine 116 may include a bubbler module 117 and an operator module 118 to facilitate performance of the cross-tabulation calculation. The bubbler module 117 performs intersection of a plurality of sets of data provided as input. The sets of data are also referred to herein as domains. The operator module 117 performs specific operations on input values, for example, performing difference of values, determining cardinality of set of elements, and the like. Further details of the bubbler module 117 and an operator module 118 are described herein.

Figure 2:
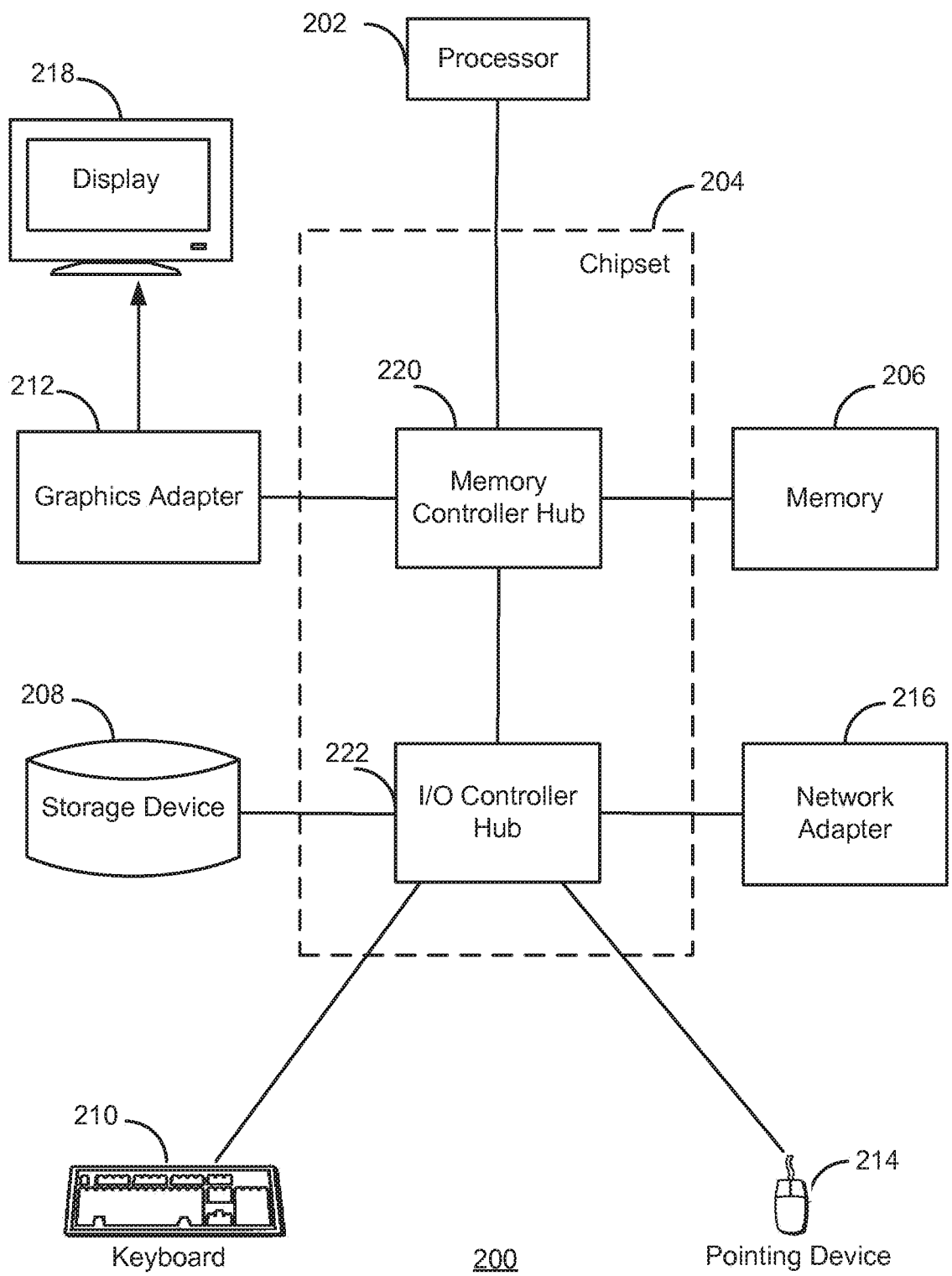
FIG. 2 is a high-level block diagram of a computer system for data mining, according to one embodiment.

FIG. 2 is a high-level block diagram of a computer 200 for use as the client 105, data mining system 108, application frontend 110, or database management system 112 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 102.

A computer 200 can have different and/or other components than those shown in FIG. 2. In addition, the computer 200 can lack certain illustrated components. In one embodiment, a computer 200 acting as the data mining system 108 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

The computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The following description of an example cross-tabulation process uses the following terms. A row dimension refers to a database column that participates in a cross-tabulation operation. A row combination refers to a combination of values of row dimensions defining a record in the cross-tabulation result. A measure in a cross-tabulation refers to a value that is determined from the inputs and stored in an individual cell as result. A measure value can be the result of an aggregation function, for example, count( ), sum( ), max( ), etc. of the values that correspond to an associated combination. A pivot dimension refers to a database column that splits the resulting measure in one value for each discrete value in the pivot column (one value per category). A resolution level refers to a table on which the aggregation function of the measure is applied (i.e. in an expression COUNT(Customers), the resolution level is the table 'Customers'.)

A domain refers to a set of table records that meet a given condition. For example, if a customer table has a column "state" storing values including California, Nevada, Texas, and the like, an example domain can be all customers from state California. A domain resolves to a specific table, that is, selects records in that table. A resolution level change refers to an action of projecting a domain from a given table to another related table. The database engine 116 projects a domain corresponding to records of a table to a result domain comprising a set of records of a results table. The database engine 116 projects a domain from an input table to a result table by using a foreign key relationship between the input table and the result table. In an embodiment, the database engine 116 determines for each record of the intersection set of domain, a corresponding record of the result table based on the foreign key relationship between the input table and the result table.

A universal filter refers to a domain applied as a filter in a cross-tabulation at the lowest level possible, i.e., applied early during the computation of the cross-tabulation result. For example, if a cross-tabulation operation is performed using a set of input tables, the universal filter is applied to the input tables rather than to intermediate or final results obtained by processing the input tables. A target filter refers to a domain applied as a filter in a cross-tabulation at the resolution level. A base filter refers to a domain used in conjunction with the target filter to compare values of data or to perform any operator using values of data from the base and the target filter.

The bubbler module 117 performs intersection of domains involved in a cross-tabulation calculation. The operator module 118 computes the aggregation functions using the incoming domain. Typical aggregation functions include 'count', 'sum', 'average', 'maximum', 'minimum', etc. Additionally, comparison functions, such as 'difference', 'relative index', 'percent', etc. . . . , can be used when two domains (e.g., target domain and base domain) are defined. The bubbler modules 117 can create data structures called bubblers for performing intersections of various input sets.

Cross-Tabulation Process

In one embodiment, the database engine 116 performs the following process to perform a cross-tabulation calculation. The columnar database management system 112 receives a request to perform a cross-tabulation operation on a set of database tables. The request may be received by the application front end 110 from a client 105 and sent to the columnar database management system 112. The request specifies one or more row dimensions representing columns of the database tables participating in the cross-tabulation operation.

In one aspect, the cross-tabulation request can be encapsulated in a suitable message format. For example, the cross-tabulation request may be encapsulated in a text format, such as XML, or in any other format. In some embodiments, the cross-tabulation request is received by the columnar database management system 112 via one or more suitable network transfer protocols. In other embodiments, the cross-tabulation request is received via an application programming interface (API) call, through receipt of a file containing the cross-tabulation request, or via an interactive console. It will be appreciated, however, that the cross-tabulation request may be received in many other ways.

The database engine 116 of the columnar database management system 112 determines the result of cross-tabulation and stores the results. The result of the cross-tabulation operation comprises rows, each row having a combination of values of row dimensions. In an embodiment, the columnar database management system 112 sends the results, for example, to the client 105 sending the request.

The database engine 116 performs the following processing for each row of the result for the cross-tabulation operation. Each row of the result is associated with a combination of values for different row dimensions. The database engine 116 determines a domain for each value of a row dimension of the combination. Each domain comprises a set of table records of the table matching the value of the row dimension. The database engine 116 determines an intersection set of domains corresponding to the row combination. The intersection set comprises table records that match the combination of values corresponding to the row. The database engine 116 determines one or more result columns for the row combination, for example, an aggregate value based on the intersection set. The database engine 116 may either store the rows of the result of the cross-tabulation as data 114 or return the result to the requestor.

Figure 3:
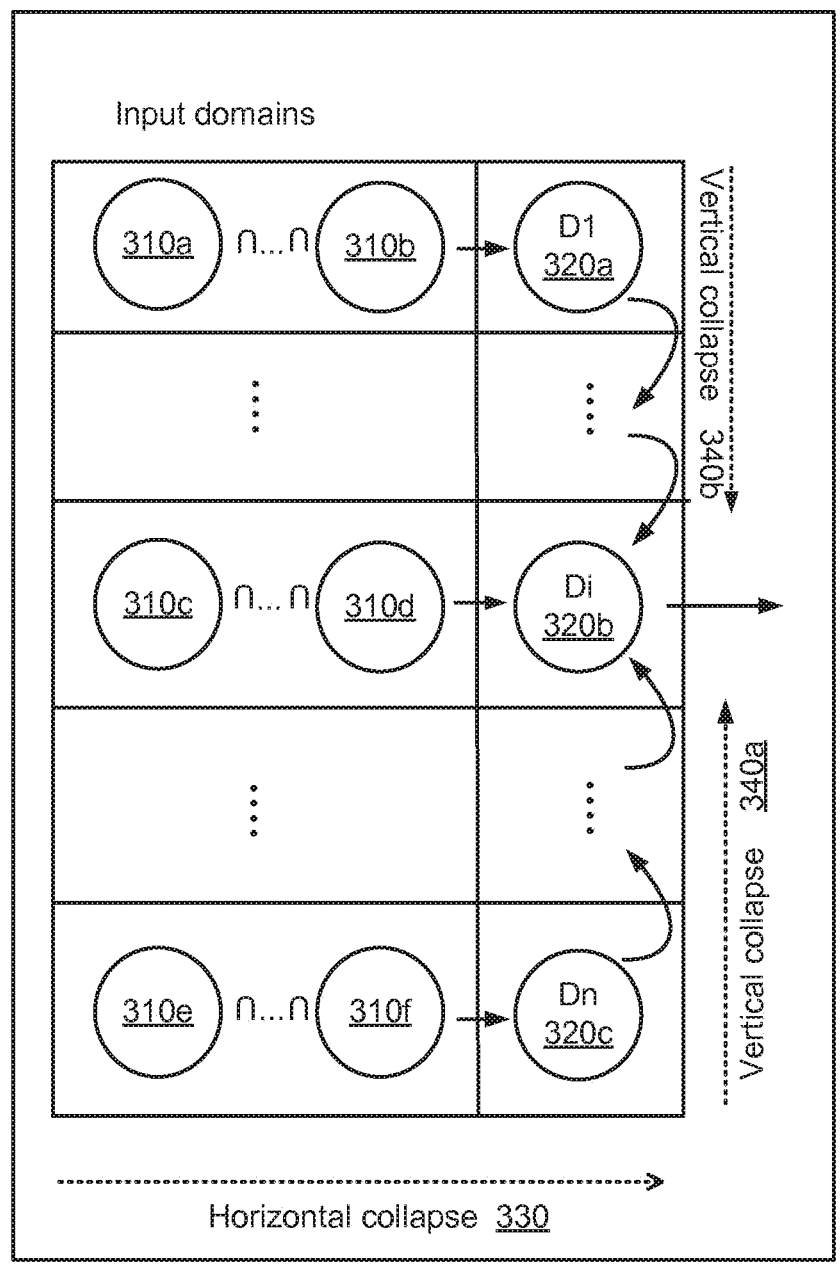
FIG. 3 illustrates the steps of horizontal collapse and vertical collapse performed as steps of a cross-tabulation operation, according to one embodiment.

FIG. 3 illustrates the steps of a horizontal collapse and a vertical collapse performed as steps of a cross-tabulation operation, according to one embodiment. A cross-tabulation request may specify multiple row dimensions based on columns of a table. The database engine 116 determines domains 310 corresponding to these row dimensions for each row and the bubbler module 117 determines intersection of these row dimensions to determine an intersection set 320 corresponding to the table. This process of combining various domains 310 corresponding to row dimensions of a table by performing intersection of the domains is called a horizontal collapse 330.

The cross-tabulation request may specify a plurality of tables as input tables. The database engine 116 determines an intersection set corresponding to each table. The database engine 116 projects the records of intersection set 320 of corresponding to a table to records of another table by performing a resolution level change. For example, the cross-tabulation request may specify a "customer" table and a "pet" table, where the result of aggregations is based on "pet" table. The database engine 116 determines a domain corresponding to intersection of various domains based on the customer table and projects the records of this domain to associated records of the customer table.

For example, if the domain includes pets p1 and p2, and pet p1 matches customer c1 and pet p2 matches customer c2, the database engine 116 projects the domain based on pets to corresponding customer records from the customer table. A single record of a table may maps to multiple records of the target table, thereby resulting in a different number of records when a resolution level change is performed. The number of records may increase, decrease, or remain the same after performing resolution change. Performing the various resolution level changes for the intersection set results is referred to as a vertical collapse 340 in which the various sets of records get mapped to records of a target table. The vertical collapse 340 moves domains towards the cross-tabulation resolution level, intersecting domains at each level in the path to the final one.

In some embodiments, the cross-tabulation specification includes one or more filters. A filter specifies certain criteria that must be satisfied for the records considered for cross-tabulation. The database engine 116 determines a filter domain for the filter value. The filter domain comprises a set of values that satisfy the filter value for the filter column of the table. The bubbler module 117 determines an intersection set of the filter domain with domains corresponding to a row combination.

In some embodiments, the cross-tabulation request specifies pivot dimensions. A pivot dimension may correspond to a column of an input table. The result of the cross-tabulation with pivot dimension includes a column for each distinct value of the specified column. To determine the result values of the pivot dimension, the database engine 116 determines a pivot domain for each discrete value of the pivot dimension. The pivot domain comprises a set of records that satisfy the corresponding value for the column of the table. The bubbler module 117 determines an intersection set of the pivot domain with domains corresponding to values of row dimensions for the row combination. The operator module 118 determines an aggregate value based on the intersection set as a value of the measure, for example, count.

Cross-Tabulation Example

Figure 4:
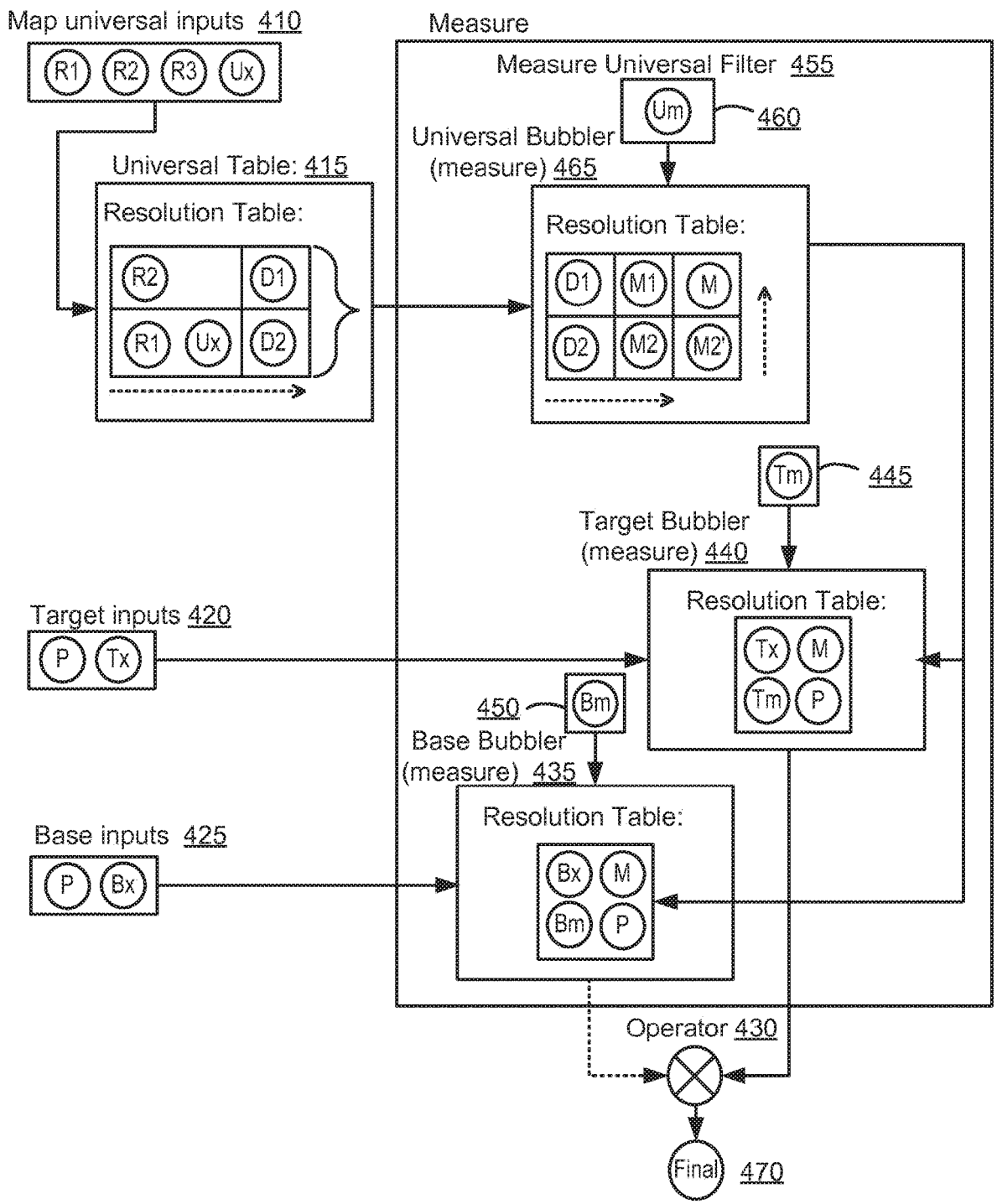
FIG. 4 illustrates various steps of the process for performing a cross-tabulation calculation, according to one embodiment.

FIG. 4 illustrates various steps of the process for performing a cross-tabulation calculation, according to one embodiment. These steps are illustrated with respect to the following example. The following example uses a customer table and a pet table. An example customer table is shown in table I including columns customer ID, age, number of children, gender (male/female) and whether the person is a member of WWF (yes/no).

TABLE I

| Age | Children | Cust ID | Name | Owner Gender | WWF member |
|---|---|---|---|---|---|
| 18 | 0 | 1 | Boris | male | No |
| 65 | 2 | 2 | Rose | female | Yes |
| 47 | 2 | 3 | Ted | male | No |
| 43 | 2 | 4 | tom | male | No |
| 19 | 0 | 5 | John | male | No |
| 35 | 2 | 6 | Mary | female | No |
| 35 | 1 | 7 | Alice | female | No |
| 18 | 0 | 8 | Jane | female | No |
| 40 | 1 | 9 | Sandra | female | Yes |
| 80 | 0 | 10 | George | male | No |
| 80 | 0 | 11 | Tim | male | No |
| 29 | 0 | 12 | Sarah | female | No |

An example pet table is shown in table II including columns, name, age, class of pet (whether the pet is reptile, mammal, fish, or bird), species, weight, and customer ID. The column customer ID can be a foreign key referring to the customer table.

TABLE II

| Age | Class | Cust ID | Name | Specie | Weight |
|---|---|---|---|---|---|
| 46 | Reptile | 1 | Buc | Turtle | 136 |
| 3 | Mammal | 1 | Bobby | Dog | 40 |
| 0.5 | Fish | 3 | Tempura | Fish | 0.03 |
| 6 | Mammal | 2 | Scout | Dog | 10 |
| 5 | Mammal | 2 | Dougie | Dog | 21 |
| 4 | Mammal | 3 | Guardian | Cat | 3 |
| 16 | Reptile | 4 | Neo | Snake | 10 |
| 5 | Reptile | 5 | Pistol | Turtle | 1 |
| 2 | Bird | 6 | Lorenzo | Duck | 2 |
| 7 | Mammal | 7 | Pluto | Dog | 17 |
| 0.5 | Fish | 7 | Jupiter | Fish | 0.02 |
| 0.4 | Fish | 7 | Mars | Fish | 0.06 |
| 0.4 | Fish | 7 | Saturn | Fish | 0.08 |
| 0.6 | Fish | 7 | Venus | Fish | 0.02 |
| 0.5 | Fish | 7 | Moon | Fish | 0.02 |
| 0.5 | Fish | 7 | Eo | Fish | 0.01 |
| 0.5 | Fish | 7 | Europa | Fish | 0.04 |
| 0.6 | Fish | 7 | Titan | Fish | 0.04 |
| 5 | Mammal | 8 | Chewie | Bear | 329 |
| 2 | Mammal | 9 | R2 | Rabbit | 3 |
| 8 | Bird | 11 | Romulus | Parrot | 0.5 |
| 3 | Mammal | 12 | Cesar | Squirrel | 0.25 |

An example cross-tabulation specification using the above data generates a report of count of customers, grouped by pet Class, with possible values "Bird", "Fish", "Mammal," "Reptile" and WWF member ("yes", "no"), including pivot dimensions showing owner gender, with values ("Male", "Female"), the report filtered by pets that are not birds (universal filter in this example).

For this example, the maximum possible number of row combinations is 8 since there are 4 discrete values in column Class which gets multiplied by 2 discrete values in the column WWF Member. Each row combination is split into 2 columns because the pivoting dimension has 2 discrete values, male and female. Omitting blank rows, the result looks as shown in table III.

TABLE III

| Class | WWF member | female | male | Total |
|---|---|---|---|---|
| Fish | No | 1 | 1 | 2 |
| Mammal | No | 3 | 2 | 5 |
| Mammal | Yes | 2 | 0 | 2 |
| Reptile | No | 0 | 3 | 3 |
| Total | | 5 | 4 | 9 |

Without omitting blank rows, the result table obtained from the cross-tabulation would look as follows.

TABLE IV

| Class | WWF member | female | male | Total |
|---|---|---|---|---|
| Bird | No | | | |
| Bird | Yes | | | |
| Fish | No | 1 | 1 | 2 |
| Fish | Yes | | | |
| Mammal | No | 3 | 2 | 5 |
| Mammal | Yes | 2 | 0 | 2 |
| Reptile | No | 0 | 3 | 3 |
| Reptile | Yes | | | |
| Total | | 5 | 4 | 9 |

In this case, Class and WWF Member are row dimensions, whereas Gender is a pivoted dimension and count (Customer) is the measure. Accordingly, the cross-tabulation presents the total number of Customers by Gender in each combination of Class and WWF Member.

The columnar database management system 112 performs the calculation process as follows. The columnar database management system 112 calculates the domain for the first discrete value in each row dimension. The number of elements with Class="Bird" is two and the number of elements with WWF Member="No" is ten. The columnar database management system 112 determines the domain for the first discrete value in the pivot dimension, i.e., owner Gender="Female." This domain has 6 elements. The columnar database management system 112 determines a domain for the Universal Filter, i.e., Class=Not "Bird" having 20 elements. Put Universal Filter and Row Dimensions domains calculated in previous steps in a Bubbler.

The columnar database management system 112 uses the bubbler module 117 to intersect the domains resolving at the same table level. The bubbler module 117 determines the resulting domain at Customer level based on input domain R2 corresponding to WWF Member="No" as D1. The bubbler module 117 determines the resulting domain at the pet level by performing intersection of a domain R1 corresponding to Class="Fish" (row dimension) and a domain Ux corresponding to Class=a "Bird" (Universal filter). The resulting domain is D2.

TABLE V

| Table level | Domains | Result |
|---|---|---|
| Customer | R2: WWF Member = "No" | D1 |
| Pet | R1: Class = "Fish" Ux: Class = Not "Bird" | D2 |

The resulting domains D1 and D2 are used as inputs for measures universal bubbler 465 (see FIG. 4). The measures bubbler 465 collapses horizontally. In this case, only D1 is at the Customer level so, no intersection is needed at this level. At Pet level there is no intersection, as only D2 is at this level. The results of horizontal collapse are M1 and M2 (in this case equal to D1 and D2).

At this stage, the columnar database management system 112 performs a vertical collapse by moving domains towards the cross-tabulation resolution level, intersecting domains at each level in the path to the final one. In this case, M2 is changed to customer level (M2': 2 elements) and intersected with M1 (M2'∩M1=M: 2 elements).

The output result of this bubbler becomes an input of the next bubbler, the target bubbler. At this stage, current pivoting domain (P) is introduced in the bubbler along with M. Every domain in the target bubbler is changed to the measure resolution level before any operation is performed with them. Then, all these are intersected (P∩M=Final: 1 element).

At the final stage, the result of this bubbler is sent to the operator count, as this is the operation set in the definition. The operator, then, generates the final value of the cell (with value '1'). The remaining cells are calculated similarly.

A cross-tabulation measure can compare results from two filters, a target filter against a base filter. The comparison may be determined by computing a function that takes two input values, one value from the base filter and the other value from the target filter. For example, the function may determine a difference, a relative index, a percentage, or any other function for comparison. The database engine 116 determines the result values for the target filter by following the steps described herein for determining results of a filter. The database engine 116 also determines the result values for the base filter by following the steps described herein. The database engine 116 provides the two result values determined to the operator module 118. The operator module 118 determines the final value for the measure by applying the comparison operator specified by the measure to the two results values input to the operator module 118.

The following example illustrates the use of base filter and target filter. The cross-tabulation requests a filter that is based on two other filters defined. A first filter "hair" that includes all those animals with fur (Bear, Cat, Dog, Rabbit, Squirrel). A second filter "no hair" includes all animals that do not have hair (e.g., Duck, Fish, Parrot, Snake, Turtle.) The cross-tabulation determines: a first measure of number of people that own one animal from the class (bird, fish, mammal, reptile) and at least one other pet that has hair and a second measure of number of people that own one animal from the class (bird, fish, mammal, reptile) and at least one other pet that has NO hair. The cross-tabulation determines a third filter "diff" which is the difference of the value of "hair" measure and the value of the "no hair" measure.

The cross-tabulation results are shown as follows.

TABLE VI

| Class | "Hair" | "no hair" | "diff" |
|---|---|---|---|
| Bird | 0 | 2 | −2 |
| Fish | 2 | 2 | 0 |
| Mammal | 7 | 3 | 4 |
| Reptile | 1 | 3 | −2 |
| Total | 7 | 7 | 0 |

The first measure (hair) has a "hair" filter applied as a target filter. Second measure (no hair) has a "no hair" filter applied as a target filter. Third measure (diff) has two filters, "hair" as a target filter and "no hair" as a base filter. For example, the second row of class "fish" has a first measure "hair" that shows that there are two people owning a fish and at least one animal with hair (Ted and Alice in this example). Furthermore, there are two people owning a fish and at least one animal without hair. The third measure calculates the difference between the target filter results and the base filter results, that is (measure "hair") 2 owners−(measure "no hair") 2 owners=0 owners.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A columnar database data mining method, comprising:
receiving, by a columnar database management system from a requestor, a request to perform a cross-tabulation operation on input tables having a columnar format, the request specifying row dimensions representing columns of the input tables, the columnar database management system having a processor and a non-transitory computer-readable medium;
responsive to the request, determining, by the columnar database management system, a result table comprising rows, each row of the result table having a combination of values of the row dimensions, the determining comprising, for each row of the result table:
for each value of a row dimension, determining a domain comprising a set of records from an input table of the input tables, the set of records matching the each value of the row dimension;

determining an intersection set of domains corresponding to the each row, the intersection set comprising a set of records that match the combination of values of the row dimensions; and determining a value for a result column for the each row as an aggregate value based on the intersection set; and storing the result table in a data store or returning a response to the requestor.

2. The columnar database data mining method according to claim 1, wherein the request specifies a first row dimension representing a column of a first table of the input tables and wherein determining a domain for each value of a row dimension comprises selecting the set of records from the first table that meet a given condition or value of the column of the first table.

3. The columnar database data mining method according to claim 2, wherein the request specifies a second row dimension representing a column of a second table, the second table having a column keyed to the first table.

4. The columnar database data mining method according to claim 1, wherein the request is received from a client device through an application frontend, directly by the database engine of the columnar database management system, via an application programming interface call, through receipt of a file containing the request, or via an interactive console.

5. The columnar database data mining method according to claim 1, wherein the result column comprises a pivot dimension, the method further comprising, for each value of the pivot dimension:

determining a pivot domain having a set of records that meet the each value of the pivot dimension; and determining an intersection of the pivot domain with domains corresponding to the values of the row dimensions.

6. The columnar database data mining method according to claim 1, wherein the result column comprises comparison values determined by applying an operator to results of a base filter and results of a target filter and wherein the operator is one of a difference operator, a relative index operator, or a percent operator.

7. The columnar database data mining method according to claim 1, wherein the aggregate value represents a measure produced by an aggregation function utilizing values corresponding to the intersection set.

8. A system, comprising:
a processor;
a non-transitory computer-readable medium; and
stored instructions translatable by the processor to perform:

receiving, from a requestor, a request to perform a cross-tabulation operation on input tables having a columnar format, the request specifying row dimensions representing columns of the input tables;

responsive to the request, determining a result table comprising rows, each row of the result table having a combination of values of the row dimensions, the determining comprising, for each row of the result table:

for each value of a row dimension, determining a domain comprising a set of records from an input table of the input tables, the set of records matching the each value of the row dimension;

determining an intersection set of domains corresponding to the each row, the intersection set comprising a set of records that match the combination of values of the row dimensions; and determining a value for a result column for the each row as an aggregate value based on the intersection set; and storing the result table in a data store or returning a response to the requestor.

9. The system of claim 8, wherein the request specifies a first row dimension representing a column of a first table of the input tables and wherein determining a domain for each value of a row dimension comprises selecting the set of records from the first table that meet a given condition or value of the column of the first table.

10. The system of claim 9, wherein the request specifies a second row dimension representing a column of a second table, the second table having a column keyed to the first table.

11. The system of claim 8, wherein the request is received from a client device through an application frontend, directly by the database engine of the columnar database management system, via an application programming interface call, through receipt of a file containing the request, or via an interactive console.

12. The system of claim 8, wherein the result column comprises a pivot dimension, the method further comprising, for each value of the pivot dimension:

determining a pivot domain having a set of records that meet the each value of the pivot dimension; and determining an intersection of the pivot domain with domains corresponding to the values of the row dimensions.

13. The system of claim 8, wherein the result column comprises comparison values determined by applying an operator to results of a base filter and results of a target filter and wherein the operator is one of a difference operator, a relative index operator, or a percent operator.

14. The system of claim 8, wherein the aggregate value represents a measure produced by an aggregation function utilizing values corresponding to the intersection set.

15. A computer program product for columnar database data mining, the computer program product comprising a non-transitory computer-readable medium storing instructions translatable by a processor to perform:

receiving, from a requestor, a request to perform a cross-tabulation operation on input tables having a columnar format, the request specifying row dimensions representing columns of the input tables;

responsive to the request, determining a result table comprising rows, each row of the result table having a combination of values of the row dimensions, the determining comprising, for each row of the result table:

for each value of a row dimension, determining a domain comprising a set of records from an input table of the input tables, the set of records matching the each value of the row dimension;

determining an intersection set of domains corresponding to the each row, the intersection set comprising a set of records that match the combination of values of the row dimensions; and determining a value for a result column for the each row as an aggregate value based on the intersection set; and storing the result table in a data store or returning a response to the requestor.

16. The computer program product of claim 15, wherein the request specifies a first row dimension representing a column of a first table of the input tables and wherein determining a domain for each value of a row dimension comprises selecting the set of records from the first table that meet a given condition or value of the column of the first table.

17. The computer program product of claim 16, wherein the request specifies a second row dimension representing a column of a second table, the second table having a column keyed to the first table.

18. The computer program product of claim 15, wherein the request is received from a client device through an application frontend, directly by the database engine of the columnar database management system, via an application programming interface call, through receipt of a file containing the request, or via an interactive console.

19. The computer program product of claim 15, wherein the result column comprises a pivot dimension, the method further comprising, for each value of the pivot dimension:
   determining a pivot domain having a set of records that meet the each value of the pivot dimension; and
   determining an intersection of the pivot domain with domains corresponding to the values of the row dimensions.

20. The computer program product of claim 15, wherein the result column comprises comparison values determined by applying an operator to results of a base filter and results of a target filter and wherein the operator is one of a difference operator, a relative index operator, or a percent operator.

* * * * *